(12) United States Patent
Neugent

(10) Patent No.: US 6,591,956 B1
(45) Date of Patent: Jul. 15, 2003

(54) BICYCLE FREEWHEEL HUB SUPPORTED ON A CENTRAL DRIVE CYLINDER

(75) Inventor: John J. Neugent, San Luis Obispo, CA (US)

(73) Assignee: Cane Creek Cycling Components, Inc., Fletcher, NC (US)

(*) Notice: Subject to any disclaimer, the term of this patent is extended or adjusted under 35 U.S.C. 154(b) by 0 days.

(21) Appl. No.: 10/134,938

(22) Filed: Apr. 29, 2002

(51) Int. Cl.[7] .............................................. F16D 23/00
(52) U.S. Cl. ...................... 192/64; 192/45.1; 192/46; 301/110.5
(58) Field of Search ...................... 192/64, 45.1, 46; 301/110.5

(56) References Cited

U.S. PATENT DOCUMENTS

| | | | |
|---|---|---|---|
| 593,688 A | * 11/1897 | Redding | 192/64 |
| 2,394,112 A | 2/1946 | Schwinn | |
| 3,182,529 A | 5/1965 | Schwerdhofer | |
| 3,650,363 A | * 3/1972 | Cristie | 192/64 |
| 3,661,034 A | 5/1972 | Schwerdhofer | |
| 4,913,500 A | * 4/1990 | Wauke et al. | 301/110.5 |
| 5,163,740 A | 11/1992 | Kawai et al. | |
| 5,458,223 A | 10/1995 | Chen | |
| 5,485,905 A | * 1/1996 | Rader, III | 192/64 |
| 5,513,733 A | 5/1996 | Fu | |
| 5,515,957 A | * 5/1996 | McConaghy | 192/64 |
| 5,518,096 A | 5/1996 | Lin | |
| 5,738,197 A | 4/1998 | Kroger et al. | |
| 6,065,580 A | * 5/2000 | Kirk | 192/217.3 |
| 6,260,681 B1 | 7/2001 | Chen | |
| 6,401,895 B1 | * 6/2002 | Chen | 192/64 |

* cited by examiner

*Primary Examiner*—Saul Rodriguez
(74) *Attorney, Agent, or Firm*—John V. Stewart

(57) ABSTRACT

An inner cylinder 5 supports and drives a hub shell 1. A sprocket hub 10 is rigidly mounted on one end of the cylinder, and may be integral with it. A bearing 2 at each end of the axle supports the cylinder and sprocket hub for rotation about the axle 1 Outer bearings 16 between the cylinder and hub shell rotationally supported hub shell. A circular ratchet 8 in the interior of the hub shell, and corresponding pawls 6 on the exterior of the cylinder, drive the hub shell when torque is applied to th sprocket hub, and allow the shell to freewheel otherwise. A more central position of the pawl drive in the hub shell compare to prior designs reduces twist of the shell. Wide separation of the bearings supporting the sprocket hub and cylinder provide a highly stable sprocket hub. These features maximize transmission efficiency and reliability.

9 Claims, 3 Drawing Sheets

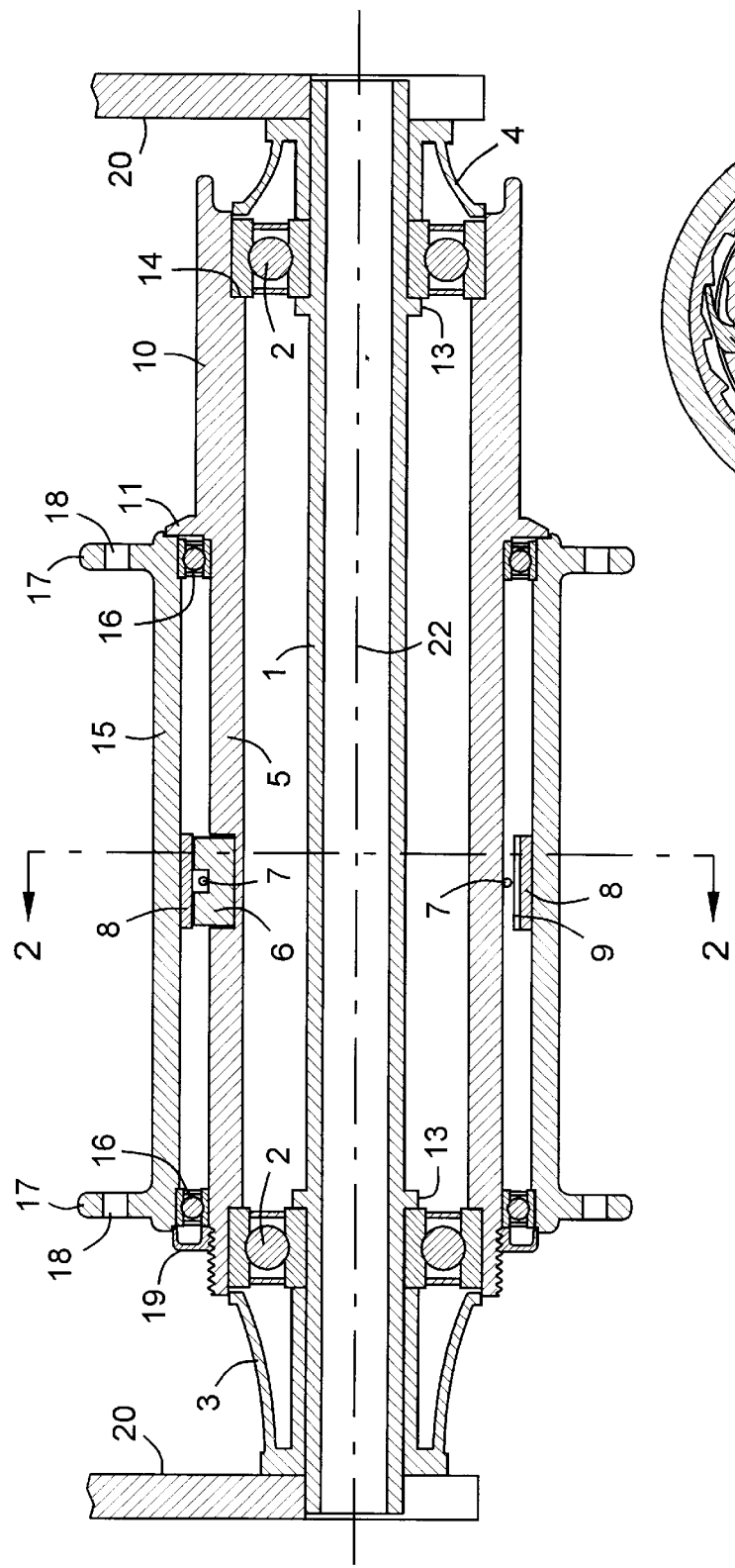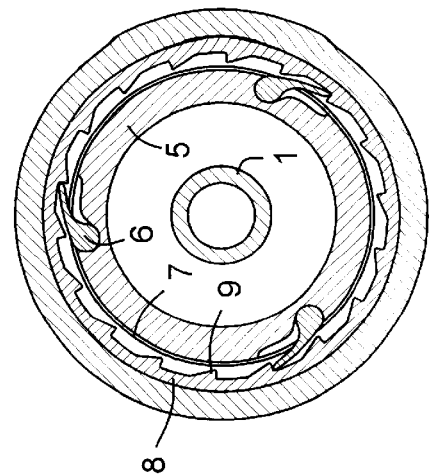

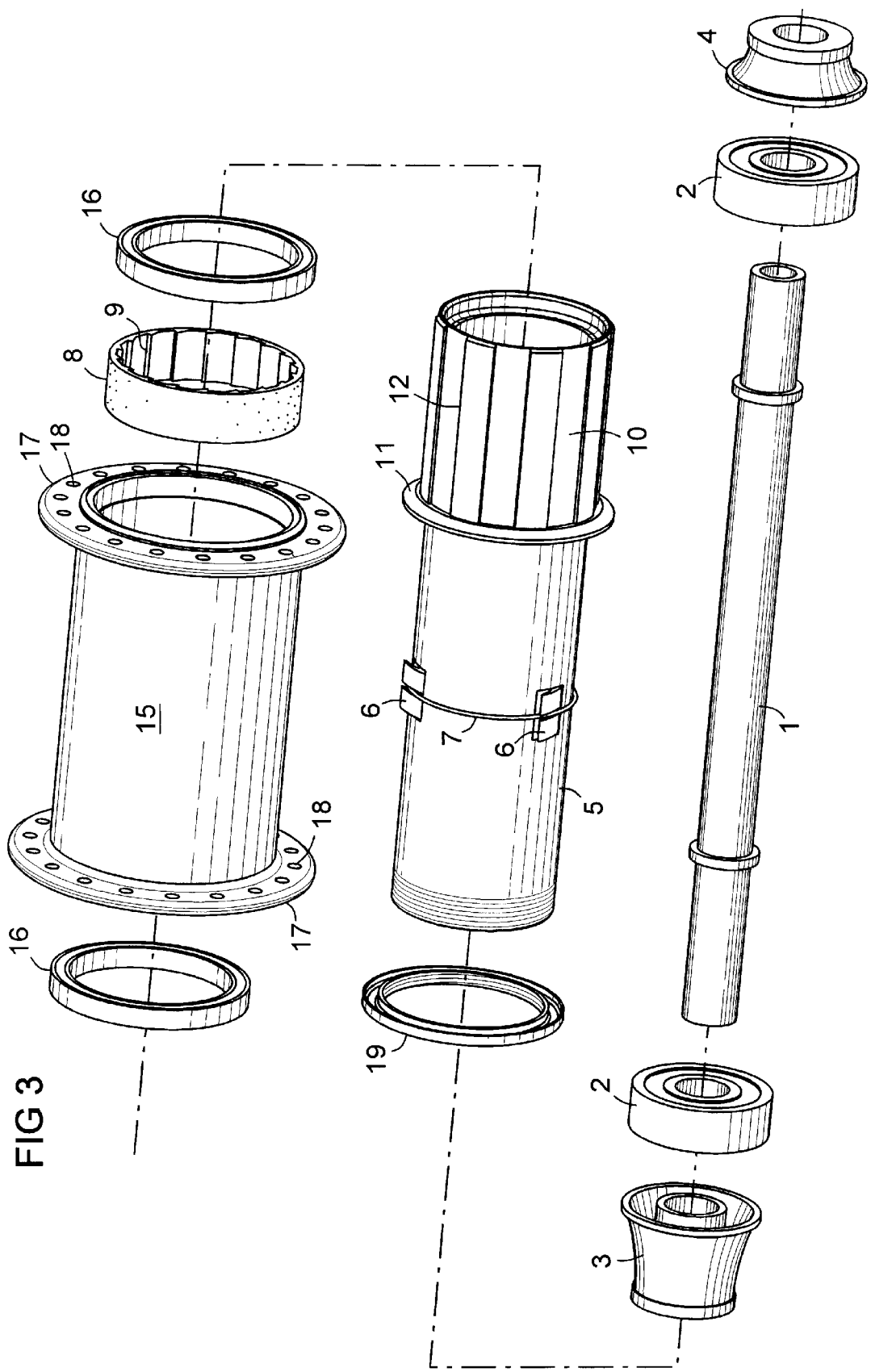

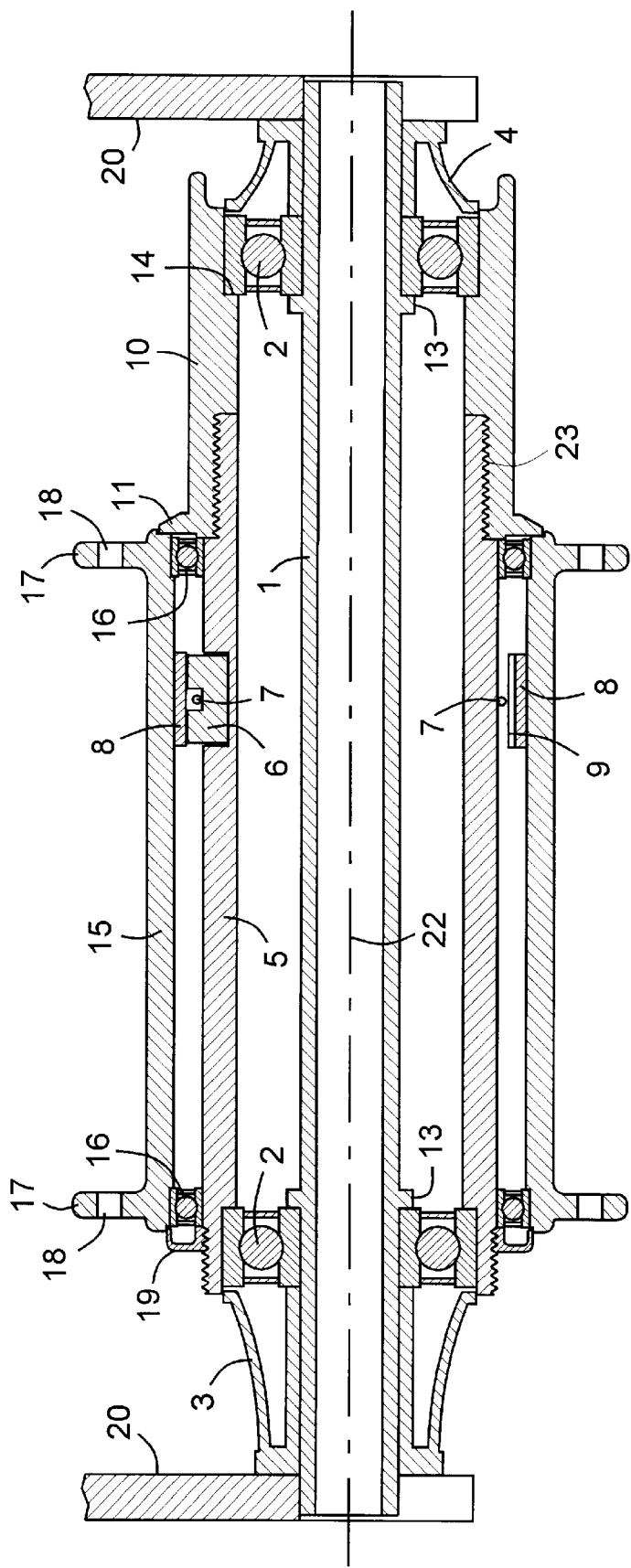

BICYCLE FREEWHEEL HUB SUPPORTED ON A CENTRAL DRIVE CYLINDER

BACKGROUND OF THE INVENTION

1. Field of the Invention

This invention relates to freewheel hubs, especially on bicycles.

2. Description of Prior Art

Bicycles normally have a freewheel hub on the rear wheel. Foot pedals on cranks drive one or more forward sprockets or chain rings, which drive a chain loop, which drives one or more rear sprockets mounted on a sprocket hub on the rear axle that drives the wheel hub. When a rider stops pedaling, the hub "freewheels" or turns freely in the forward direction independently of the sprockets, so the pedals do not keep turning with the wheels. This allows a rider to relax or concentrate on steering without constant leg motion. In general, a freewheel hub can be provided on any powered wheel of a velocipede, or pedal-powered vehicle.

A bicycle axle is mounted between two bicycle frame members. A conventional freewheel hub includes a hub shell rotationally mounted on the axle, and a sprocket hub mounted beside the hub shell to co-rotate with the hub shell in the drive direction, and to rotate independently of the hub shell in the coasting direction. The hub shell supports a wheel via spokes or a plate. The sprocket hub supports one or more sprockets for the drive chain.

The sprocket hub drives the hub shell via a circular ratchet ring and pawls. For this purpose, a drive assembly is attached to the hub shell, and extends into the sprocket hub. The drive assembly receives rotational force from the sprocket hub, and transfers it to the hub shell. Thus the drive assembly must be firmly indexed to the hub shell. Pawls are mounted on the drive assembly, and a ratchet ring is mounted on the interior of the sprocket hub, or vice versa. The sprocket hub can wobble on the drive assembly due to normal play in the sprocket hub bearings, and the fact that these bearings are close together. This causes friction and wear on the drive assembly. The drive assembly exerts torsion on one end of the hub shell. This twists the hub shell, and works the connection between the drive assembly and hub shell with each pedal cycle, causing the connection to loosen. Thus, rigidity of the assembly is lost, resulting in friction, wear, wobble, metal fatigue, and failure. Examples of the prior art are shown in U.S. Pat. Nos. 5,458,223 and 5,518,096. Both of these patents attempt to solve the above problems of instability and loosening between the hub shell and the drive assembly. However this is done with an increment of the prior technology by mounting the driving assembly more firmly to the hub shell, rather than by the new technology herein.

Other prior patents show various designs of freewheel hubs. Some of these are complex, and none of them provide the advantages of the present invention as summarized below.

SUMMARY OF THE INVENTION

The main objective of the invention is a freewheel hub design for bicycles with a more stable sprocket hub and less twist and loosening of the hub assembly than occurs in prior designs. Further objectives include simplicity, practicality, and lightness of weight.

These objectives are achieved in a freewheel hub for bicycles with an inner drive cylinder 5 that supports a hub shell 1. A sprocket hub 10 is mounted on one end of the cylinder, and may be integral with it. A bearing 2 at each end of the axle supports the cylinder and sprocket hub for rotation about the axle 1. Outer bearings 16 between the cylinder and hub shell rotationally support the hub shell. A circular ratchet 8 in the interior of the hub shell, and corresponding pawls 6 on the exterior of the cylinder, drive the hub shell when torque is applied to the sprocket hub, and allow the shell to freewheel otherwise. A more central position of the pawl drive in the hub shell than in prior designs reduces twist of the shell. Wide separation of the bearings supporting the sprocket hub and cylinder provide a stable sprocket hub. These features provide maximum transmission efficiency and reliability.

BRIEF DESCRIPTION OF THE DRAWINGS

FIG. 1 is a sectional rear view taken on a vertical plan through the axis of a freewheel hub according to a preferred embodiment of the invention.

FIG. 2 is a sectional view taken along line 2—2 of FIG. 1.

FIG. 3 is an exploded perspective view of the invention.

FIG. 4 is a sectional rear view showing an alternate position of the pawl and circular ratchet, and an optional 2-part construction of the cylinder and sprocket hub unit.

REFERENCE NUMBERS

1. Axle
2. Inner bearing
3. Left inner bearing retainer
4. Right inner bearing retainer
5. Hollow cylinder or cylindrical tube
6. Pawl
7. Pawl spring
8. Circular ratchet
9. Ratchet tooth
10. Sprocket hub
11. Right outer bearing protector and shell retainer
12. Spline for sprockets
13. Axle/bearing stop annulus
14. Inner bearing stop lip in each end of cylinder
15. Hub shell
16. Outer bearing
17. Wheel spoke mounting flange
18. Wheel spoke mounting hole
19. Left outer bearing protector and shell retainer
20. Axle mounting plate or drop-out
22. Axis
23. Optional threaded connection of cylinder and sprocket hub

DETAILED DESCRIPTION

FIG. 1 shows a sectional view of the invention. An axle 1 is mounted between left and right mounting plates 20 on the frame of a bicycle. The hollow axle is fixed to the mounting plates by a quick-release axle fastener that uses a control rod passing through the axle. This type of fastener is conventional in the bicycle industry, and is not shown. It does not matter what type of axle fastener is used. Alternately, the axle could have threaded ends extending beyond the mounting plates, and be fixed to the mounting plates with threaded nuts. This option is also conventional, and is not shown.

A hollow cylinder 5 is rotationally mounted on the axle with inner bearings 2 at each end of the axle. One end of the cylinder 10 is formed as a sprocket hub to retain one or more sprockets for a drive chain. The sprocket hub is preferably integral with the cylinder as in FIGS. 1 and 3, or they may be assembled in two parts as in FIG. 4. The sprockets and drive chain are conventional, and are not shown here. Normally a sprocket hub has an external spline 12 as shown in FIG. 3 to rotationally fix or index the sprockets. Other indexing means can be used if desired.

In a suggested assembly method, the axle is inserted through the cylinder, and the inner bearings 2 are then pressed into each end of the cylinder to a stop against a lip 14. The inner bearings have a slip fit on the axle. Stop rings 13 on the axle abut the inner races of the inner bearings to retain the axle in the cylinder.

Pawls 6 are mounted around the cylinder as shown in FIGS. 1–3. The pawls are pivoting levers that are urged to pivot outward by a spring 7. Circular ratchets and pawls are well known, and other forms can be used. A novel feature is the cylinder passing completely through the hub shell, providing a mounting point for a pawl drive anywhere in the interior of the hub shell 15. The pawls are preferably mounted at or near the center of the hub shell as in FIGS. 1 and 3. This exerts drive torque near the center of the hub shell, reducing relative twist between the ends of the shell in comparison to exerting torque at one end of the shell as in prior devices.

However, there are other advantages of weight, assembly, and strength that would lead one to locate the ratchet nearer the drive side bearing of the hub shell, as shown in FIG. 4. This is a design decision trade-off.

A circular ratchet 8 is installed in the hub shell around the pawls. This can be assembled by pressing the ratchet into the interior of the hub shell, or by other means. The ratchet has inward-facing teeth as shown. In the drive direction of relative rotation between the cylinder and shell, the ratchet teeth catch the pawls, and the shell co-rotates with the cylinder. In the coasting or freewheel direction of relative rotation, the pawls slip over the teeth. Alternately, the pawls can be located on the interior of the hub shell facing inward, and ratchet can be on the exterior of the cylinder with teeth facing outward. This is not shown, and is not preferred.

Outer bearings 16 are pressed into each end of the shell. They support the shell on the cylinder for rotation. The axle, cylinder, and shell are coaxial. A right outer bearing protector rim 11 on the cylinder retains the shell on the right end. A left outer bearing protector 19 is threaded onto the cylinder against the left outer bearing, and retains the shell on the left end.

The drive cylinder 5 is preferably integral with the sprocket hub 10. This avoids a separable connection that could develop play as often occurs in prior designs. Alternately the cylinder and sprocket hub can be assembled from two parts into a rigid unit as shown in FIG. 4. This allows a different material for each part, such as steel for the cylinder and aluminum for the sprocket hub. The thread connection 23 can be locked with an adhesive compound if desired, to eliminate all play and loosening. In either embodiment, the-wide separation of the bearings 2 that support the cylinder and sprocket hub unit provides exceptional stability for the sprocket hub as compared to prior designs.

Although the present invention has been described herein with respect to a preferred embodiment, the foregoing description is intended to be illustrative, not restrictive. Modifications of the present invention will occur to those skilled in the art. All such modifications that fall within the scope of the appended claims are intended to be within the scope of the present invention. Alternative design and assembly choices are possible within the scope of this invention.

I claim:

1. A freewheel hub comprising:

an axle having an axis;

a hub shell having first and second ends;

a hollow cylinder passing axially through the hub shell and supporting both ends of the hub shell on bearings on the cylinder for rotation about the axis;

a sprocket hub on one end of the cylinder, extending from one end of the hub shell for carrying at least one sprocket;

the axle passing axially through the cylinder and sprocket hub, and supporting the cylinder and sprocket hub on bearings on the axle for rotation about the axis; and a one-way rotational drive connection between the cylinder and the hub shell that allows one direction of relative rotation between the hub shell and the cylinder, and otherwise engages the hub shell to co-rotate with the cylinder.

2. The freewheel hub of claim 1, wherein the one-way rotational drive connection comprises a circular ratchet mounted approximately centrally in the interior of the hub shell, and pawls mounted on the exterior surface of the cylinder for contact with the ratchet.

3. The freewheel hub of claim 1, wherein the one-way rotational drive connection comprises a circular ratchet mounted in the interior of the hub shell, in an axial position between the center of the hub shell and the end of the hub shell nearest the sprocket-supporting end of the drive-cylinder, and pawls mounted on the exterior surface of the cylinder for contact with the ratchet.

4. The freewheel hub of claim 1, wherein the sprocket hub is integral with the cylinder.

5. The freewheel hub of claim 1, wherein the sprocket hub is assembled onto the cylinder with a threaded connection.

6. A freewheel hub comprising:

an axle having an axis;

a hollow drive cylinder with two ends;

a sprocket hub integral with the drive cylinder, forming one end of the drive cylinder;

each end of the drive cylinder rotationally supported on the axle by a bearing between the axle and the cylinder;

a hub shell having two ends, each end of the shell rotationally supported on the drive cylinder by a bearing between the drive cylinder and the hub shell;

the sprocket hub extending beyond one of the ends of the hub shell; and a one-way rotational drive connection between the drive cylinder and the hub shell that allows one direction of relative rotation between the hub shell and the cylinder, and otherwise engages the hub shell to co-rotate with the cylinder.

7. The freewheel hub of claim 6, wherein the one-way rotational drive comprises a circular ratchet substantially centered in the interior of the hub shell, and pawls mounted on the exterior of the drive cylinder for engaging the ratchet teeth, whereby when drive torque is applied to the sprocket hub it is transmitted centrally and symmetrically to the hub shell for minimum distortion of the hub shell.

8. The freewheel hub of claim 6, wherein the one-way rotational drive connection comprises a circular ratchet mounted in the interior of the hub shell in an axial position between the center of the hub shell and the end of the hub shell nearest the sprocket hub, and pawls mounted on the exterior surface of the cylinder for contact with the ratchet.

9. A freewheel hub comprising:

an axle having an axis and two ends;

a hub shell having first and second ends;

a hollow cylinder passing axially through the hub shell and supporting both ends of the hub shell on bearings for rotation about the axis;

a sprocket hub rigidly mounted on one end of the cylinder, and extending from one end of the hub shell for carrying at least one sprocket;

the axle passing axially through the cylinder and sprocket hub, supporting the cylinder and sprocket hub as a unit on at least one bearing at each end of the axle for rotation of the cylinder and sprocket hub about the axis; and a ratchet and pawl rotational drive transmission between the cylinder and the hub shell that allows one direction of relative rotation between the hub shell and the cylinder, and otherwise engages the hub shell to co-rotate with the cylinder.

* * * * *